US007602889B2

United States Patent
Lewis et al.

(10) Patent No.: US 7,602,889 B2
(45) Date of Patent: Oct. 13, 2009

(54) DYNAMICALLY ALERTING CALLERS OF CHANGES TO MENU STRUCTURES IN A TELEPHONE PROMPTING SYSTEM

(75) Inventors: James R. Lewis, Delray Beach, FL (US); Wallace J. Sadowski, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/944,576

(22) Filed: Nov. 23, 2007

(65) Prior Publication Data
US 2008/0069314 A1 Mar. 20, 2008

Related U.S. Application Data

(63) Continuation of application No. 10/988,082, filed on Nov. 12, 2004, now Pat. No. 7,346,153.

(51) Int. Cl.
*H04M 11/06* (2006.01)
(52) U.S. Cl. .............. 379/88.18; 379/88.01; 379/88.12; 379/88.13; 379/88.17; 379/201.01; 455/406; 455/456.1; 463/40; 704/270.1; 704/275; 717/125
(58) Field of Classification Search .............. 379/88.12, 379/88.16, 88.18, 88.01, 88.13, 88.17, 201.01, 379/202.01; 455/456.1, 406; 707/203; 717/125; 715/810; 463/40; 704/270.1, 275; 713/200
See application file for complete search history.

(56) References Cited

U.S. PATENT DOCUMENTS

| | | | |
|---|---|---|---|
| 5,737,393 A * | 4/1998 | Wolf ...................... | 379/88.13 |
| 5,790,637 A | 8/1998 | Johnson et al. | |
| 6,061,433 A | 5/2000 | Polcyn et al. | |
| 6,104,790 A | 8/2000 | Narayanaswami | |
| 6,455,699 B1 | 9/2002 | Curran et al. | |
| 6,456,699 B1 * | 9/2002 | Burg et al. .............. | 379/88.17 |
| 6,654,722 B1 | 11/2003 | Aldous et al. | |
| 6,678,365 B1 * | 1/2004 | Kinoshita .............. | 379/201.01 |
| 7,428,302 B2 * | 9/2008 | Zirngibl et al. .......... | 379/88.12 |
| 7,440,898 B1 * | 10/2008 | Eberle et al. ............. | 704/270.1 |
| 7,453,994 B2 * | 11/2008 | Kortum et al. ........... | 379/88.18 |
| 7,457,395 B2 * | 11/2008 | Creamer et al. .......... | 379/88.01 |
| 2001/0014146 A1 | 8/2001 | Beyda et al. | |
| 2002/0010611 A1 * | 1/2002 | Yamaji et al. .................. | 705/8 |
| 2003/0026409 A1 | 2/2003 | Bushey et al. | |
| 2003/0103608 A1 * | 6/2003 | Pearson et al. ........... | 379/88.18 |
| 2003/0169300 A1 * | 9/2003 | Colgrove ..................... | 345/810 |
| 2004/0224661 A1 * | 11/2004 | Pericas et al. ................ | 455/406 |
| 2004/0224769 A1 * | 11/2004 | Hansen et al. ................ | 463/40 |
| 2004/0250107 A1 * | 12/2004 | Guo ........................... | 713/200 |

* cited by examiner

*Primary Examiner*—Gerald Gauthier
(74) *Attorney, Agent, or Firm*—Richard A. Tomlin, Esq.; Steven M. Greenberg, Esq.; Carey Rodriguez Greenberg & Paul LLP

(57) ABSTRACT

A method, system and apparatus for dynamically alerting calling parties of menu structure changes in a telephone prompting system. In a telephone prompting system, a menu structure change alert method can include determining whether a menu structure change has occurred for the telephone prompting system in response to the receipt of an incoming call from a calling party. Subsequently, the calling party can be selectively alerted of the menu structure change. In this regard, an alert message can be played to the calling party.

8 Claims, 2 Drawing Sheets

DYNAMICALLY ALERTING CALLERS OF CHANGES TO MENU STRUCTURES IN A TELEPHONE PROMPTING SYSTEM

BACKGROUND OF THE INVENTION

1. Statement of the Technical Field

The present invention relates to the field of call processing systems, and more particularly to processing menu changes in a telephone prompting system.

2. Description of the Related Art

Telephone prompting systems are increasing employed to provide an interface to voicemail systems and to provide an interface for interactive voice response systems (IVR), such as airline reservations, bank customer account lines, and other institutional lines such those of government, utilities, credit card companies and the like. Many systems, such as those used for banking or stock trading, may be frequently accessed by individual users, often several times a day. In such systems, users are presented with hierarchical levels of prompts that the customer can respond to by depressing buttons on the telephone keypad or through spoken words. The resulting dual tone multifrequency (DTMF) signals or audio are received by the prompting system and used to access a different level in the hierarchy or to access a specified function.

Prompting system technologies do not require human interaction over the telephone as the user's interaction with the database is predetermined by what the prompting system will permit the user to access. For example, banks and credit card companies use prompting systems so that their customers can receive up-to-date account information instantly and easily without having to speak directly to a person. Prompting system technology, such as that found in IVR systems also can be used to gather information, as in the case of telephone surveys in which the user is prompted to answer questions by pushing the numbers on a touch-tone telephone.

Sometimes, the menu structures of a telephone prompting system must be changed due to changing levels of service such as when a new service option has been added or when existing service options have been removed. Other circumstances can include the re-organization of a menu resulting from caller complaints, business rule changes or priorities, usability testing, and the like. When menu structure changes are made, it is important to inform the calling parties of such menu changes in order to minimize navigational errors, as well as erroneous transfers to unwanted agents. This can be helpful when a calling party attempts to "key ahead" to reach a known destination or menu in a prompting system but unwittingly ends up in a menu or accessing a service that is unwanted. However, after a while, repeated messages or announcements of menu changes may frustrate and annoy certain calling parties who are frequent users of the prompting system.

SUMMARY OF THE INVENTION

The present invention addresses the deficiencies of the art in respect to telephone prompting systems and provides a non-obvious method, system and apparatus for dynamically alerting calling parties of menu structure changes in a telephone prompting system. In a telephone prompting system, a menu structure change alert method can include determining whether a menu structure change has occurred for the telephone prompting system in response to the receipt of an incoming call from a calling party. Subsequently, the calling party can be selectively alerted of the menu structure change. In this regard, an alert message can be played to the calling party.

In a particular aspect of the invention, the step of selectively alerting the calling party can include identifying the calling party and retrieving a set of call statistics for the identified calling party. Subsequently, an alert can be provided to the calling party only if permitted by the call statistics. Otherwise, the alert can be withheld if an alert is not permitted by the call statistics.

In another aspect of the present invention, a call processing system can include a telephone prompting system having a menu structure. The system further can include call statistics storage configured to store call statistics for callers. Finally, the system yet further can include dynamic alerting logic configured for coupling to the telephone prompting system and the call statistics storage in order to selectively alert callers of changes to the menu structure based upon call statistics for the callers stored in the call statistics storage.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for dynamically alerting calling parties of changes to menu structures in call processing systems. In accordance with the present invention, a dynamic alerting process can detect when changes are made to the menu structure of a call processing system. Responsive to detecting a change to the menu structure, a message can be presented telephonically in order to alert the calling party of the menu changes. Additionally, it automatically can be determined when to stop the presentation of the menu change message so as to not irritate the caller with repetitive information.

In operation, a query can be received in the call processing system and processed by dynamic alerting logic. The dynamic alerting logic can access call statistics for the calling party in order to determine whether a menu change message or alert can be presented to the calling party. Consequently, the dynamic alerting process provides a message to alert a calling party of menu changes while restricting the alerting feature based upon pre-determined criteria.

Figure 1:
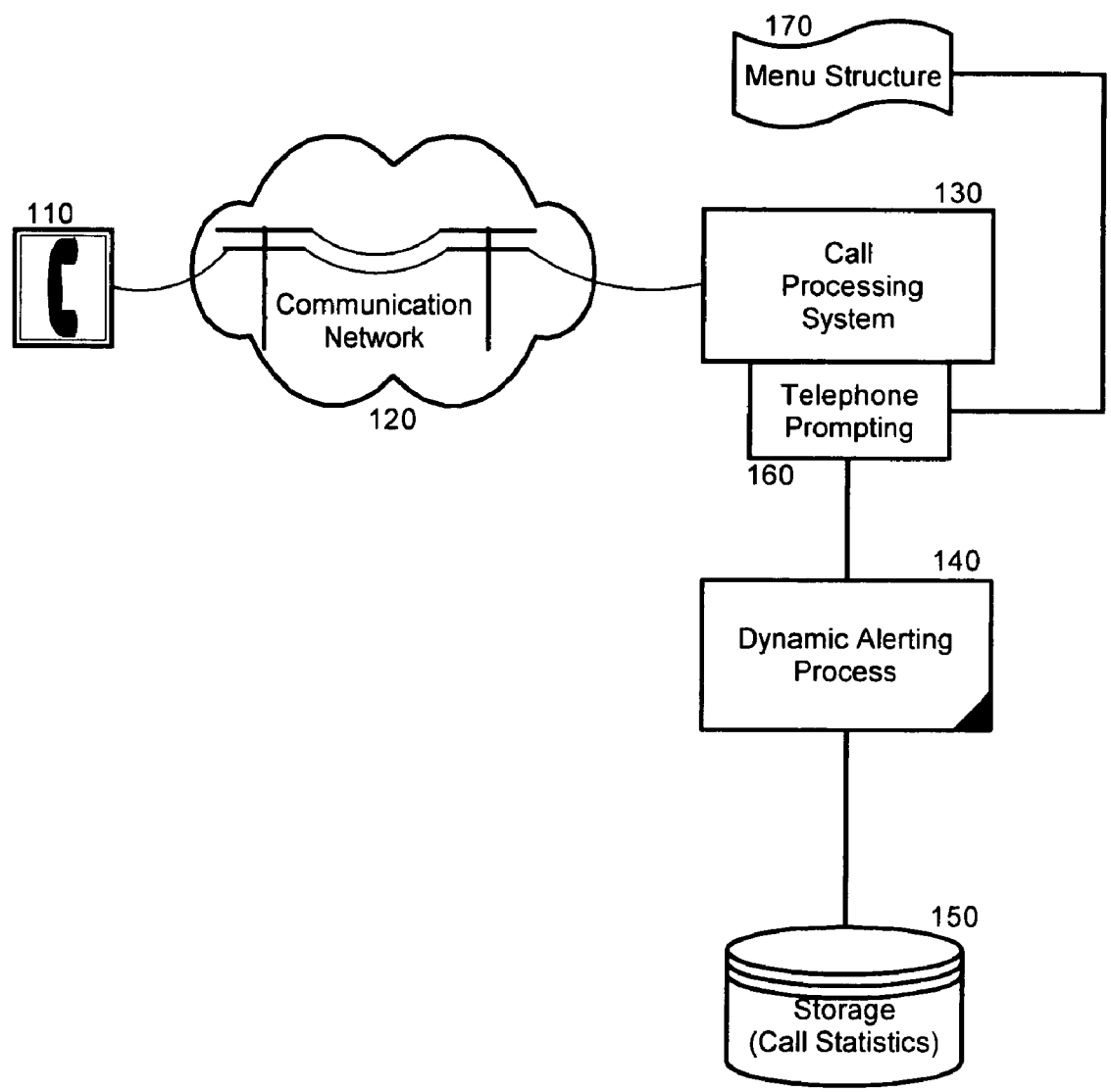
FIG. 1 is a schematic illustration of a system, method and apparatus for dynamically alerting calling parties of menu structure changes in a call processing system; and, FIG. 2 is a flow chart illustrating a process for dynamically alerting calling parties of menu structure changes in the call processing system of FIG. 1.

In further illustration of the foregoing inventive arrangements, FIG. 1 is a schematic illustration of a system, method and apparatus for dynamically alerting calling parties of changes to menu structures in call processing systems. The call processing system 130 can be configured for communicative linkage to one or more calling parties 110 over the communication network 120. In this regard, the communications network can be a PSTN, a data communications network configured to carry telephonic data, or any combination thereof. The call processing system 130 can include a telephone prompting sub-system 160 programmed to prompt calling parties 110 with information based upon a menu structure 170. Importantly, dynamic alerting logic 140 can be coupled to the telephone prompting sub-system 160 as well as data storage of caller statistics 150.

In accordance with the present invention, the dynamic alerting logic 140 can determine for an incoming call from a caller 10 whether or not the underlying menu structure 170 for the call processing system 130 has changed. If so, the dynamic alerting logic 140 can access caller statistics 150 to determine whether or not it is permissible to issue an alert to the caller 110 that the menu structure 170 has changed. If permitted, an alert can be issued to the caller 110. Otherwise, no alert can be issued.

Figure 2:
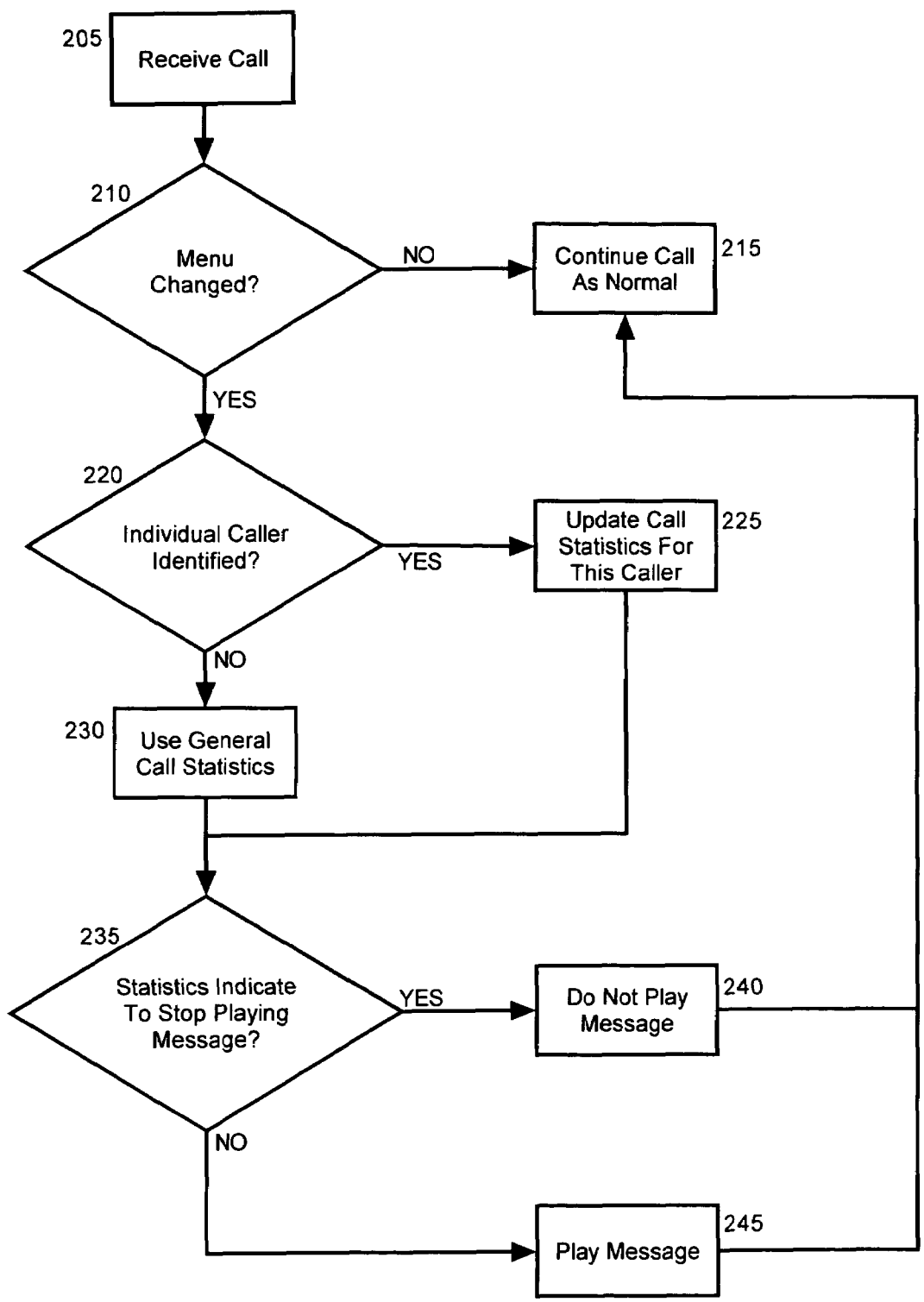

In more particular illustration of the process of the invention, FIG. 2 is a flow chart illustrating a method for processing calls based upon the dynamic alerting process in the system of FIG. 1. Beginning in block 205, a call is received by the system. The call can be received telephonically over a telephone network from an external or internal telephone calling party, or over an external or internal data communications network.

In further explanation, FIG. 2 is a flow chart illustrating a process for alerting a calling party when the menu is updated or changed. Beginning in decision block 210, the system determines if there have been any changes to the system menu. If there are no menu changes, the call can continue as normal as indicated in block 215. Otherwise, if there is a menu change, the system will ascertain the identity of the calling party and whether the calling party has previously accessed the system in decision block 220. If the calling party is identified, then in block 225 the "call statistics" for this specific calling party are retrieved from the storage and updated. The "call statistics" can include various calling party information such as the ID or PIN number for the calling part, the number of times the party has heard a particular alert message, and the like. If the caller does not have an identity stored in the system, a general set of call statistics can be used for this particular call as shown in block 230. Naturally, going forward, a specific identity for this calling party can be generated and the appropriate call statistics assigned and updated.

The call statistics of blocks 225 or 230 are then passed to decision block 235. In decision block 235, the call statistics are evaluated and it can be determined whether the alert message should be played or not. As mentioned previously, various criteria may be used to determine when an alert message should no longer been provided to a calling party. A system administer can specify which call statistics (e.g., elapsed time, number of calls, some combination of these, or the like) are used to make the play or no play alert message decision. If the message should be played, the process will continue through block 245. If not, the process can continue to block 240. In either event, the process will continue through to block 215 where the call can be continued in a normal manner.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general-purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

The invention claimed is:

1. In a telephone prompting system, a menu structure change alert method comprising the steps of:
    responsive to the receipt of an incoming call from a calling party, determining whether a menu structure change has occurred for the telephone prompting system; and,
    selectively alerting said calling party of said menu structure change.

2. The method of claim 1, wherein said step of selectively alerting said calling party comprises the steps of:
    identifying said calling party;
    retrieving a set of call statistics for said identified calling party; and,
    providing an alert to said calling party only if permitted by said call statistics.

3. The method of claim 1, wherein said step of selectively alerting said calling party comprises the step of selectively playing an alert message to said calling party.

4. The method of claim 2, further comprising the step of withholding said alert if an alert is not permitted by said call statistics.

5. A machine readable storage having stored thereon a computer program for dynamically alerting calling parties of menu structure changes in a telephone prompting system, the computer program comprising a routine set of instructions which when executed by a machine cause the machine to perform the steps of:
    responsive to the receipt of an incoming call from a calling party, determining whether a menu structure change has occurred for the telephone prompting system; and, selectively alerting said calling party of said menu structure change.

6. The machine readable storage of claim 5, wherein said step of selectively alerting said calling party comprises the steps of:

retrieving a set of call statistics for said identified calling party; and, providing an alert to said calling party only if permitted by said call statistics.

7. The machine readable storage of claim 5, wherein said step of selectively alerting said calling party comprises the step of selectively playing an alert message to said calling party.

8. The machine readable storage of claim 6, further comprising an additional set of instructions which when executed by the machine causes the machine to perform the additional step of withholding said alert if an alert is not permitted by said call statistics.

* * * * *